United States Patent
Hendry et al.

(10) Patent No.: US 9,984,431 B2
(45) Date of Patent: May 29, 2018

(54) GPU WORKLOAD PREDICTION AND MANAGEMENT

(71) Applicant: Apple Inc., Cupertino, CA (US)

(72) Inventors: Ian C. Hendry, San Jose, CA (US); Anthony G. Sumpter, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 14/918,831

(22) Filed: Oct. 21, 2015

(65) Prior Publication Data

US 2016/0042489 A1  Feb. 11, 2016

Related U.S. Application Data

(63) Continuation of application No. 13/663,289, filed on Oct. 29, 2012, now Pat. No. 9,196,013.

(60) Provisional application No. 61/553,735, filed on Oct. 31, 2011.

(51) Int. Cl.
　*G06T 1/00*　　(2006.01)
　*G06T 1/20*　　(2006.01)
　*G06F 1/32*　　(2006.01)

(52) U.S. Cl.
　CPC .............. *G06T 1/20* (2013.01); *G06F 1/3206* (2013.01); *G06F 1/3287* (2013.01)

(58) Field of Classification Search
　None
　See application file for complete search history.

(56) References Cited

U.S. PATENT DOCUMENTS

| | | | |
|---|---|---|---|
| 9,196,013 B2 | 11/2015 | Hendry et al. | |
| 2008/0058999 A1* | 3/2008 | Khodorkovsky | G06F 1/206 700/297 |
| 2009/0167770 A1 | 7/2009 | Navale et al. | |
| 2011/0055596 A1* | 3/2011 | Wyatt | G06F 1/206 713/300 |
| 2011/0291746 A1* | 12/2011 | Ibrahim | G06F 1/3206 327/538 |
| 2012/0001925 A1 | 1/2012 | Andonieh et al. | |
| 2012/0054519 A1* | 3/2012 | Branover | G06F 1/3203 713/322 |
| 2012/0081373 A1 | 4/2012 | Li et al. | |
| 2012/0293519 A1* | 11/2012 | Ribble | G06T 15/005 345/501 |
| 2013/0106881 A1 | 5/2013 | Hendry et al. | |
| 2013/0321437 A1* | 12/2013 | Hsieh | G06T 1/20 345/522 |

* cited by examiner

*Primary Examiner* — Zhengxi Liu
*Assistant Examiner* — Khoa Vu
(74) *Attorney, Agent, or Firm* — Meyertons, Hood, Kivlin, Kowert & Goetzel, P.C.; Lawrence J. Merkel

(57) ABSTRACT

The disclosed embodiments provide a system that configures a graphics-processing unit (GPU) in a computer system. During operation, the system predicts an incoming workload to the GPU. Next, the system identifies an operational floor for the GPU based on the incoming workload. Finally, the system uses the operational floor to configure the subsequent execution of the GPU, wherein the operational floor facilitates processing of the incoming workload by the GPU.

18 Claims, 4 Drawing Sheets

GPU WORKLOAD PREDICTION AND MANAGEMENT

PRIORITY INFORMATION

This application is a continuation of U.S. patent application Ser. No. 13/663,289, filed Oct. 29, 2012 and now U.S. Pat. No. 9,196,013, which claims priority to U.S. Provisional Application No. 61/553,735, filed on Oct. 31, 2011, which are incorporated by reference herein in its entirety.

BACKGROUND

Technical Field

Embodiments described herein are related to the field of graphics-processing units (GPUs) in computer systems. More specifically, the present embodiments relate to techniques for predicting an incoming workload to a GPU and configuring the subsequent execution of the GPU based on the incoming workload.

Related Art

Power management is critically important for many electronic devices. For example, portable electronic devices such as laptop computers, mobile phones, and personal digital assistants (PDAs) need to conserve power to operate for any length of time on battery power. At the same time, many of these portable electronic devices are beginning to incorporate high-resolution, high-power graphics technology. Rapid developments in this area have led to significant advances in 2D and 3D graphics technology, providing users with increasingly sophisticated visual experiences in domains ranging from graphical user interfaces to realistic gaming environments. Underlying many of these improvements is the development of dedicated graphics-rendering devices, or graphics-processing units (GPUs). A typical GPU includes a highly parallel structure that efficiently manipulates graphical objects by rapidly performing a series of primitive operations and displaying the resulting images on graphical displays.

To enable efficient graphics processing while reducing power consumption, the operating level (e.g., operating voltage and/or frequency) of the GPU may be adjusted based on the workload of the GPU. For example, the workload of the GPU may be periodically and/or continuously sampled. If the sampled workload is high, the GPU's operating level may be increased, making the GPU faster but less efficient. Conversely, if the sampled workload is low, the GPU's operating level may be decreased, causing the GPU to execute more slowly but also more efficiently.

Such sampling-based power management may cause the GPU's operating level to be adjusted based on the GPU's past workload instead of the GPU's current workload. In turn, the delayed response to changes in the workload may reduce GPU performance and/or efficiency during the processing of rapidly and/or periodically fluctuating workloads. For example, sampling of the GPU's workload may take up to 100 milliseconds, while adjustment of the GPU's operating level may not be complete until several milliseconds after the GPU's workload has been sampled. As a result, the GPU's operating level may be out of sync with workloads that fluctuate every 100-200 milliseconds, with an increase in the operating level occurring as the workload decreases and a decrease in the operating level occurring as the workload increases.

Hence, what is needed is a mechanism for improving the synchronization of GPU operating levels with GPU workloads.

SUMMARY

The disclosed embodiments provide a system that configures a graphics-processing unit (GPU) in a computer system. During operation, the system predicts an incoming workload to the GPU. Next, the system identifies an operational floor for the GPU based on the incoming workload. Finally, the system uses the operational floor to configure the subsequent execution of the GPU, wherein the operational floor facilitates processing of the incoming workload by the GPU.

In some embodiments, the incoming workload is predicted based on at least one of:
 (i) command buffers associated with the GPU;
 (ii) graphics calls to the GPU;
 (iii) applications associated with the GPU; and
 (iv) application programming interfaces (APIs) associated with the GPU.

In some embodiments, the operational floor is associated with at least one of an operating voltage, an operating frequency, a memory bandwidth, a latency, a power-gating configuration, a cache configuration, and a throughput.

In some embodiments, using the operational floor to configure the subsequent execution of the GPU involves obtaining an operating level of the GPU, and modifying the operating level of the GPU based on at least one of the operational floor, an existing workload of the GPU, a bottleneck in the GPU, a minimum configuration of the GPU, an operational ceiling for the GPU, and a thermal limit for the GPU.

In some embodiments, modifying the operating level of the GPU involves at least one of increasing the operating level based on the existing workload, the minimum configuration, or the operational floor, and decreasing the operating level based on the bottleneck, the operational ceiling, or the thermal limit.

In some embodiments, the operational ceiling and the thermal limit are associated with a higher priority than the existing workload and the operational floor.

In some embodiments, the operational ceiling is based on at least one of the thermal limit and a battery runtime associated with the computer system.

BRIEF DESCRIPTION OF THE FIGURES

In the figures, like reference numerals refer to the same figure elements.

DETAILED DESCRIPTION

Figure 1:
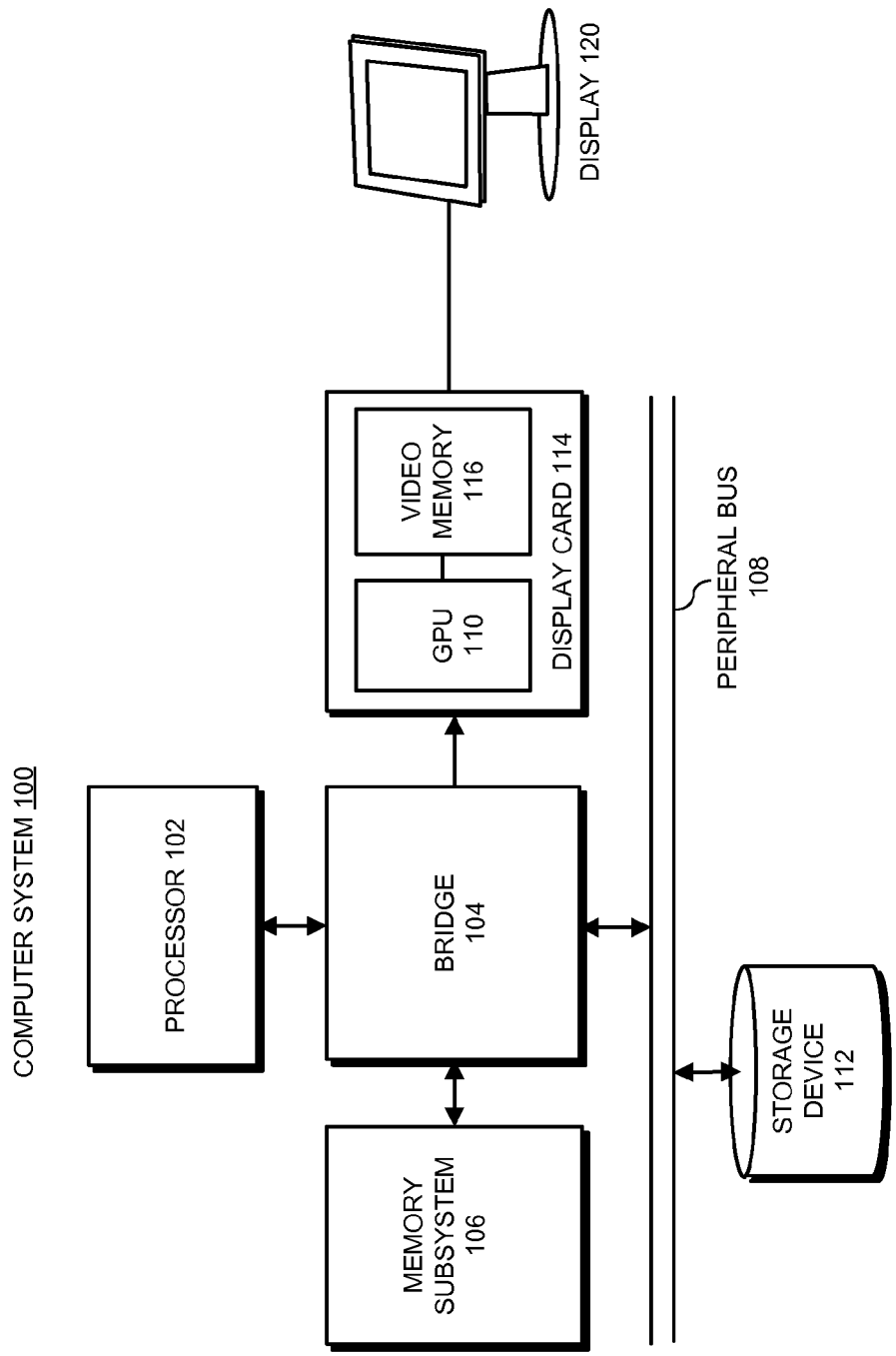
FIG. 1 shows a computer system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for configuring a graphics-processing unit (GPU) in a computer system. The computer system may correspond to a portable electronic device, laptop computer, personal computer, workstation, media player, and/or another electronic device capable of driving a display. The GPU may be a high-power, discrete GPU that is connected to a motherboard in the computer system through an interface such as Peripheral Component Interconnect Express (PCIe). Conversely, the GPU may be a low-power, embedded GPU that is integrated into the motherboard of the computer system.

More specifically, the disclosed embodiments provide a method and system for synchronizing the workload of the GPU with the operating level of the GPU. The workload may correspond to the amount of graphics processing to be done by the GPU, while the operating level may include the operating voltage, operating frequency, memory bandwidth, latency, power-gating configuration, cache configuration, and/or throughput of the GPU.

First, an incoming workload to the GPU may be predicted by analyzing command buffers, graphics calls, applications, and/or application programming interfaces (APIs) associated with the GPU. Next, an operational floor for the GPU may be identified based on the incoming workload. The operational floor may correspond to a lower bound on the operating voltage, operating frequency, memory bandwidth, latency, and/or throughput to be achieved by the GPU to process the incoming workload in a timely and/or efficient manner.

Finally, the operational floor is used to configure the subsequent execution of the GPU. In particular, an operating level of the GPU may be obtained and adjusted based on a series of thermal, performance, and/or efficiency bounds, including the operational floor, an existing workload of the GPU, a bottleneck in the GPU, a minimum configuration of the GPU, an operational ceiling for the GPU, and/or a thermal limit for the GPU. Such configuration of the GPU's operating level may increase the GPU's responsiveness to rapidly fluctuating workloads while facilitating the safe, efficient, and effective execution of the GPU.

FIG. 1 shows a computer system 100 in accordance with the disclosed embodiments. Computer system 100 may correspond to a personal computer, laptop computer, portable electronic device, workstation, and/or other electronic device capable of driving a display 120. As shown in FIG. 1, computer system 100 includes a processor 102 that is coupled through a bridge chip 104 to a memory subsystem 106 containing semiconductor memory. Processor 102 may also communicate with a storage device 112 containing non-volatile storage through a peripheral bus 108 coupled to bridge chip 104. For example, storage device 112 may be a disk drive containing non-volatile magnetic storage.

In addition, processor 102 may communicate with display 120 using a display card 114. More specifically, processor 102 is coupled to display card 114 through bridge chip 104. Display card 114 includes a graphics-processing unit (GPU) 110 that performs various graphical processing operations to produce video frames in one or more framebuffers located in video memory 116. The video frames may then be used to produce video streams that drive display 120. For example, the video streams may be transmitted over a standardized video interface such as Digital Visual Interface (DVI) or High-Definition Multimedia Interface (HDMI) to drive an external display (e.g., cathode ray tube (CRT) display, liquid crystal display (LCD), plasma display, organic light-emitting diode (OLED) display, surface-conducting electron-emitter display (SED), etc.) connected to computer system 100.

Those skilled in the art will appreciate that the workload of GPU 110 may fluctuate over time. For example, the workload of GPU 110 may be proportional to the number and/or complexity of graphics calls made to GPU 110 by applications on computer system 100. To facilitate workload processing by GPU 110, the operating level (e.g., operating voltage, operating frequency, etc.) of GPU 110 may be modified in response to changes in the workload of GPU 110. For example, computer system 100 may periodically and/or continuously sample the workload of GPU 110 during execution of GPU 110. If the sampled workload has increased, computer system 100 may increase the operating level of GPU 110. On the other hand, if the sampled workload has decreased, computer system 100 may decrease the operating level of GPU 110.

However, such sampling-based power management of GPU 110 may prevent computer system 100 from responding to rapid fluctuations in the workload of GPU 110. For example, computer system 100 may sample GPU 110 over a span of 100 milliseconds and finish modifying the operating level of GPU 110 several milliseconds after the workload of GPU 110 has been sampled. As a result, adjustments to the operating level of GPU 110 may be made over 100 milliseconds after changes to the workload of GPU 110 have occurred.

In turn, the delay in the responsiveness of GPU 110 to changes in workload may cause the GPU's operating voltage and/or frequency to be out of sync with rapid and/or frequent workload fluctuations. For example, short, "bursty" workloads that occur every 100-200 milliseconds may cause GPU 110 to be at a low operating level when a workload is to be processed and at a high operating level when no workload is to be processed. Similarly, the sampled workload of GPU 110 may be based on the workload for one application and/or process, causing the operating level of GPU 110 to be adjusted too low if multiple workloads are received at around the same time from multiple applications and/or processes.

In one or more embodiments, computer system 100 facilitates the processing of workloads by GPU 110 by predicting an incoming workload to GPU 110 and configuring the subsequent execution of GPU 110 based on the incoming workload. The incoming workload may be predicted based on command buffers, graphics calls, applications, and/or APIs associated with GPU 110. Furthermore, the incoming workload may reflect the cumulative workload from multiple applications and/or processes instead of the workload for a single application and/or process. Next, an operational floor for GPU 110 may be identified based on the incoming workload. The operational floor may be associated with the operating voltage, operating frequency, memory bandwidth, latency, power-gating configuration, cache configuration, and/or throughput of GPU 110.

Finally, the operational floor may be used to configure the subsequent execution of GPU 110. In particular, an operating level of GPU 110 may be obtained and modified based on a series of thermal, performance, and/or efficiency bounds, including the operational floor, an existing workload of GPU 110, a bottleneck in GPU 110, a minimum configuration of GPU 110, an operational ceiling for GPU 110, and/or a thermal limit for GPU 110. For example, the existing workload, minimum configuration, and/or operational floor may be used to increase the operating level of GPU 110, while the bottleneck, operational ceiling, and/or thermal limit may be used to decrease the operating level of GPU 110. Prediction-based configuration of GPUs is discussed in further detail below with respect to FIG. 2.

Figure 2:
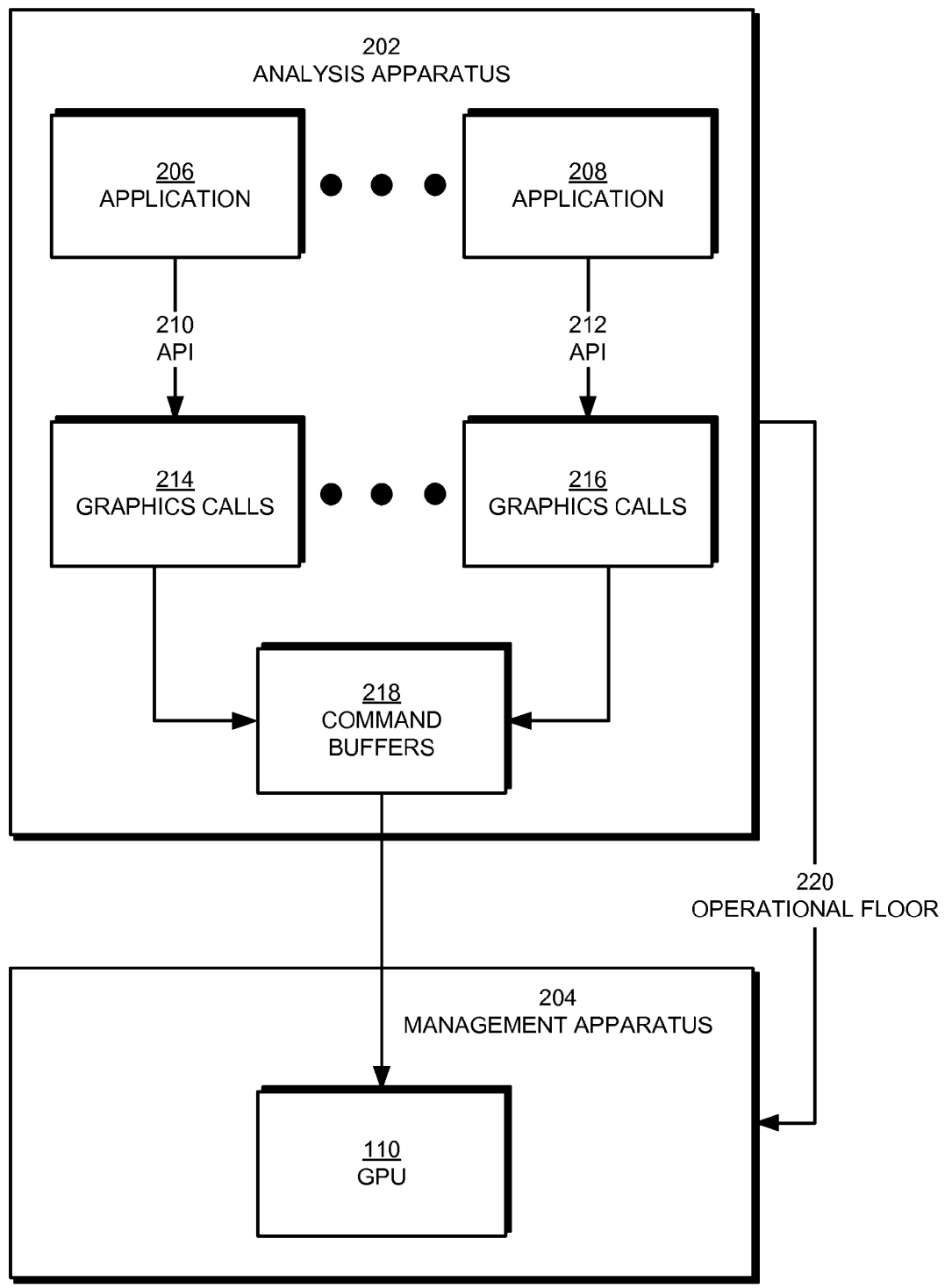
FIG. 2 shows a system for configuring a graphics-processing unit (GPU) in a computer system in accordance with the disclosed embodiments.

FIG. 2 shows a system for configuring GPU 110 in a computer system (e.g., computer system 100 of FIG. 1) in accordance with the disclosed embodiments. The system includes an analysis apparatus 202 and a management apparatus 204.

As mentioned above, the system of FIG. 2 may facilitate workload processing in GPU 110, including the processing of rapidly and/or frequently fluctuating workloads. First, analysis apparatus 202 may predict an incoming workload to GPU 110. To predict the incoming workload, analysis apparatus 202 may monitor and/or analyze the use of GPU 110 on the computer system.

More specifically, analysis apparatus 202 may analyze applications 206-208 that use GPU 110 to perform graphics processing, graphics calls 214-216 made by applications 206-208 to GPU 110, APIs 210-212 used by applications 206-208 to make graphics calls 214-216, and/or command buffers 218 to which graphics calls 214-216 are written. For example, analysis apparatus 202 may assess the size of the incoming workload based on the launch of applications 206-208 with dependencies on GPU 110 and/or the use of graphics libraries and/or graphical APIs by applications 206-208. Analysis apparatus 202 may also predict the incoming workload based on the queuing of graphics calls 214-216 in command buffers 218, the number of outstanding command buffers 218, and/or the referencing of resources on GPU 110 by graphics calls 214-216. As a result, analysis apparatus 202 may be configured to assess both the individual workloads of applications 206-208 as well as cumulative workloads arising from the submission of graphics calls 214-216 by applications 206-208 at around the same time.

Next, analysis apparatus 202 may identify an operational floor 220 for GPU 110 based on the incoming workload. Operational floor 220 may correspond to a set of operating parameters that enables efficient processing of the incoming workload by GPU 110. For example, operational floor 220 may include an operating voltage, operating frequency, memory bandwidth, latency, power-gating configuration (e.g., configuration of power gates in GPU 110), cache configuration (e.g., configuration of the cache of GPU 110), and/or throughput to be achieved by GPU 110 to efficiently process the incoming workload.

In particular, operating floor 220 may represent a configuration of GPU 110 that allows GPU 110 to perform a certain amount of work over a defined period, rather than a specific operating voltage, operating frequency, memory bandwidth, latency, and/or other hardware-specific attribute of GPU 110. For example, operating floor 220 may be calculated as a percentage of the maximum throughput of GPU 110 to be achieved over a particular amount of time (e.g., in processing the incoming workload). Alternatively, operating floor 220 may include specific values for one or more hardware-specific attributes of GPU 110. For example, operating floor 220 may include a specific operating voltage, operating frequency, memory bandwidth, latency, power-gating configuration, and/or cache configuration for GPU 110.

Analysis apparatus 202 may then provide operational floor 220 to management apparatus 204, and management apparatus 204 may use operational floor 220 to configure the subsequent execution of GPU 110. For example, analysis apparatus 202 may provide operational floor 220 to management apparatus 204 through a side channel, and management apparatus 204 may configure one or more operating parameters of GPU 110 based on operational floor 220.

More specifically, management apparatus 204 may obtain an operating level of GPU 110 that corresponds to the operating voltage, operating frequency, memory bandwidth, latency, and/or throughput of GPU 110. Management apparatus 204 may then modify the operating level of GPU 110 based on operational floor 220, an existing workload of GPU 110, a bottleneck in GPU 110 (e.g., memory bandwidth limit), a minimum configuration of GPU 110 (e.g., minimum memory bandwidth), an operational ceiling for GPU 110, and/or a thermal limit for GPU 110.

For example, management apparatus 204 may increase the operating level of GPU 110 based on the existing workload, the minimum configuration, and/or operational floor 220 and decrease the operating level based on the bottleneck, the operational ceiling, and/or the thermal limit. Furthermore, the operational ceiling and/or thermal limit may be associated with a higher priority than the existing workload and/or operational floor 220. In other words, management apparatus 204 may apply a series of upper and lower bounds associated with operational floor 220, the existing workload, the bottleneck, the minimum configuration, the operational ceiling, and/or the thermal limit to the operating level to obtain a new operating level for GPU 110. Modification of GPU operating levels is discussed in further detail below with respect to FIG. 4.

Finally, management apparatus 204 may facilitate processing of the incoming workload by GPU 110 by applying the new operating level to GPU 110. For example, management apparatus 204 may modify the operating voltage, operating frequency, memory bandwidth, latency, cache configuration, and/or power-gating configuration of GPU 110 so that the execution of GPU 110 conforms to the new operating level.

Furthermore, management apparatus 204 may apply the new operating level to GPU 110 in a way that prepares GPU 110 for handling the incoming workload. For example, the new operating level (e.g., based on operating floor 220) may specify a power state containing a set of hardware-specific attributes (e.g., operating voltage, operating frequency, memory bandwidth, etc.) of GPU 110 and a percentage of the throughput attainable at the power state to be completed by GPU 110 over a period of five milliseconds. Management apparatus 204 may then adjust the slow-changing hardware-specific attributes based on the new operating level but leave the fast-changing hardware-specific attributes at previous (e.g., lower) levels until the incoming workload arrives at GPU 110. For example, fast-changing hardware-specific attributes may include graphics engine clock speeds and voltages, while slow-changing hardware-specific attributes may include memory system clock speeds and memory system bus widths. Other attributes may be either fast-changing or slow-changing, such as attributes associated with power gating and cache power. Note that by using the above-described techniques, management apparatus 204 may selectively modify attributes of GPU 110 in a way that optimizes both the processing of the incoming workload and power conservation in GPU 110.

By configuring the execution of GPU 110 based on the incoming workload to GPU 110, the system of FIG. 2 may increase both the efficiency and performance of GPU 110. In particular, analysis apparatus 202 and management apparatus 204 may synchronize changes to the operating level of GPU 110 with changes in the workload of GPU 110, allowing GPU 110 to adapt to rapid fluctuations in the workload. Analysis apparatus 202 and management apparatus 204 may additionally facilitate the safe, efficient, and effective processing of workloads by GPU 110 by adjusting the operating level of GPU 110 based on a series of thermal, performance, and/or efficiency bounds.

Those skilled in the art will appreciate that the system of FIG. 2 may be implemented in a variety of ways. For example, analysis apparatus 202 may be implemented in software such as a device driver for GPU 110 and/or a software framework associated with GPU 110. Alternatively, analysis apparatus 202 may be provided by a microcontroller and/or other hardware module on the computer system and/or GPU 110. Furthermore, analysis apparatus 202 and management apparatus 204 may be provided by a single component (e.g., GPU 110) or a combination of software and/or hardware components.

Figure 3:
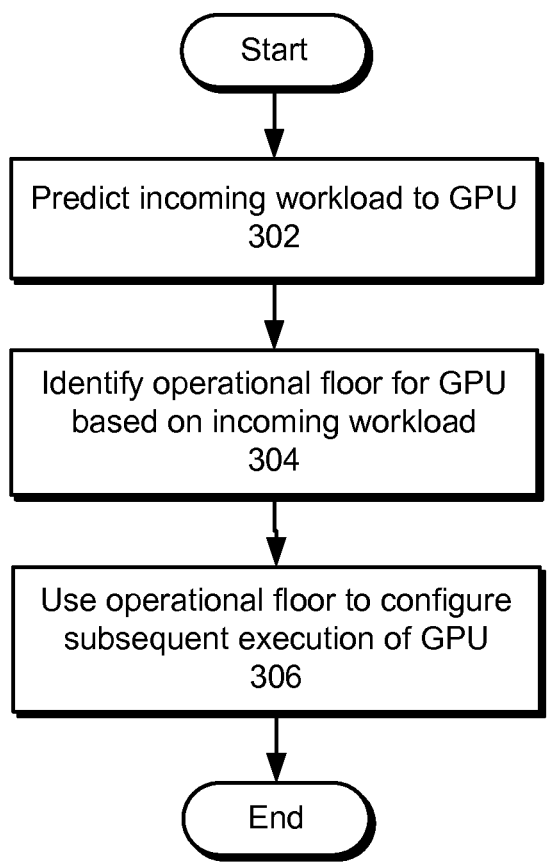
FIG. 3 shows a flowchart illustrating the process of configuring a GPU in a computer system in accordance with the disclosed embodiments.

FIG. 3 shows a flowchart illustrating the process of configuring a GPU in a computer system in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, an incoming workload to the GPU is predicted (operation 302). The incoming workload may be predicted by analyzing command buffers, graphics calls, applications, and/or APIs associated with the GPU. Next, an operational floor for the GPU is identified based on the incoming workload (operation 304). The operational floor may correspond to an operating voltage, operating frequency, memory bandwidth, latency, and/or throughput to be achieved by GPU 110 to process the incoming workload in a timely and/or efficient manner.

Finally, the operational floor is used to configure the subsequent execution of the GPU (operation 306). To configure the subsequent execution of the GPU, an operating level of the GPU is obtained and modified based on the operational floor, an existing workload of the GPU, a bottleneck in the GPU, a minimum configuration of the GPU, an operational ceiling for the GPU, and/or a thermal limit for the GPU. Modification of the operating level of the GPU is discussed in further detail below with respect to FIG. 4.

Figure 4:
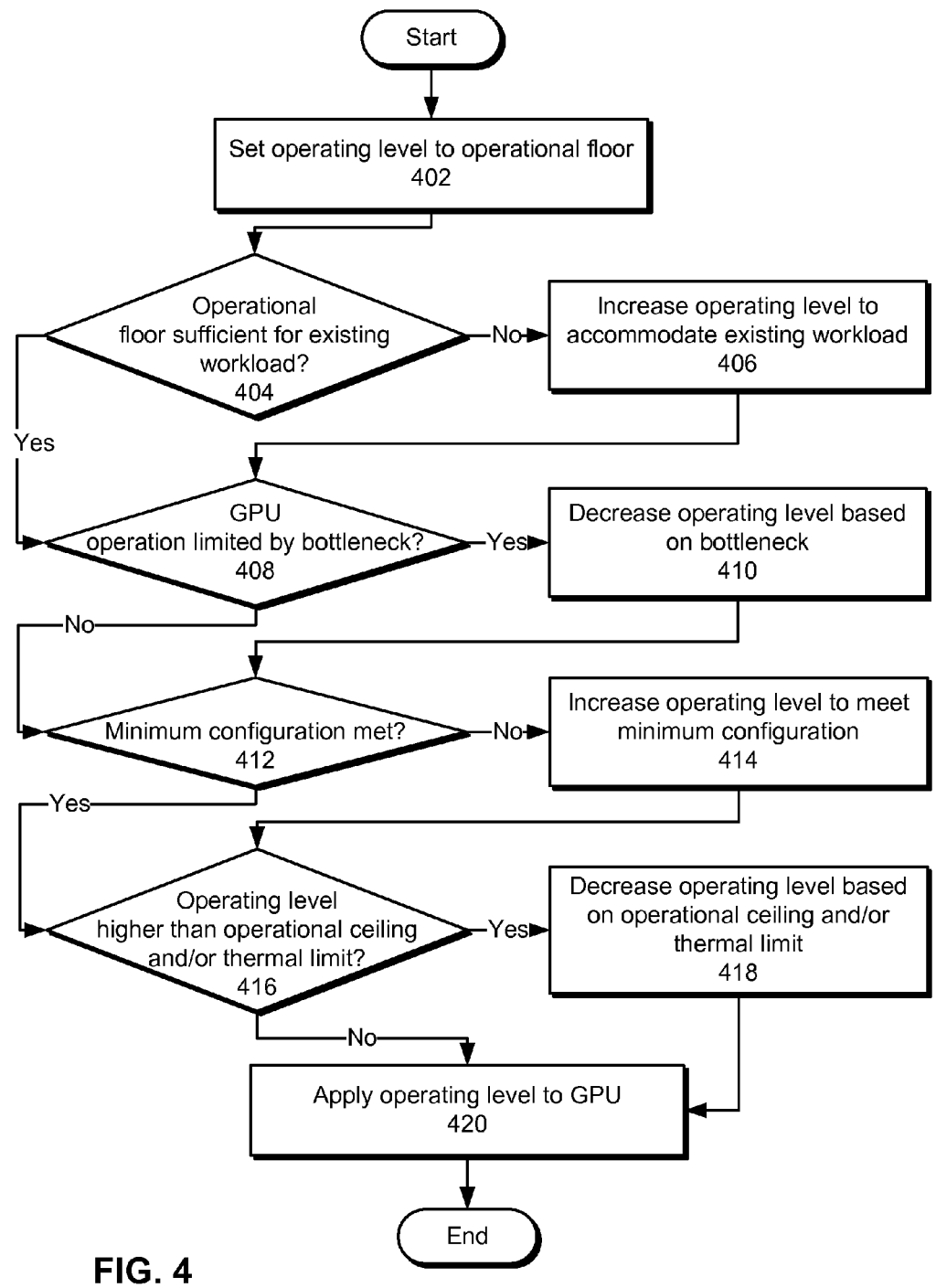
FIG. 4 shows a flowchart illustrating the exemplary configuration of the subsequent execution of a GPU in accordance with the disclosed embodiments.

FIG. 4 shows a flowchart illustrating the exemplary configuration of the subsequent execution of a GPU in accordance with the disclosed embodiments. As mentioned above, the subsequent execution of the GPU may be configured by obtaining the operating level of the GPU and modifying the operating level based on a series of lower and/or upper bounds associated with the safety, performance, and/or efficiency of the GPU.

First, the operating level may be set to the operational floor (operation 402). However, the operational floor may or may not be sufficient for the existing workload (operation 404) of the GPU. For example, the operational floor may not be sufficient if the incoming workload to the GPU is smaller than the existing workload of the GPU. If the operational floor is not sufficient for the GPU's existing workload, the operating level is increased to accommodate the existing workload (operation 406).

The operation of the GPU may also be limited by a bottleneck (operation 408). For example, the memory bandwidth of the GPU may limit the rate at which the GPU processes graphics calls. If a bottleneck exists, an increase in other parameters (e.g., operating voltage, operating frequency, etc.) associated with the operating level may not produce an increase in the performance of the GPU. As a result, the operating level may be decreased based on the bottleneck (operation 410). For example, the operating voltage and/or frequency of the GPU may be decreased so that the GPU executes at the highest possible rate permitted by the bottleneck.

Conversely, the operating level may or may not meet a minimum configuration (operation 412) for the GPU. For example, the minimum configuration may specify a minimum memory bandwidth required of the GPU to drive multiple displays. Along the same lines, the minimum configuration may be provided by a user and/or based on the type of power supplied to the GPU (e.g., battery, mains, etc). If the operating level does not meet the minimum configuration, the operating level is increased to meet the minimum configuration (operation 414).

Furthermore, the operating level may be higher than an operational ceiling and/or thermal limit (operation 416). The operational ceiling may correspond to a system-based cap on the operating level of the GPU. For example, the operational ceiling may limit the operating level of the GPU based on a maximum temperature (e.g., thermal limit) for the GPU and/or a battery runtime of a computer system containing the GPU. The GPU may additionally include a chip-based thermal limit that prevents the GPU from overheating if the system-based operational ceiling does not account for extreme thermal events such as loss of a thermal interface layer between the GPU and a heat sink.

To prevent thermal damage to the GPU and/or reduced runtime of a battery powering the computer system, the operating level may be decreased based on the operational ceiling and/or thermal limit (operation 418). For example, if the operating level exceeds the system-based operational ceiling, the operating level may be capped at the operational ceiling. If the capped operating level still exceeds the chip-based thermal limit, the operating level may be further reduced based on the thermal limit. Because the operational ceiling and/or thermal limit are applied last, the operational ceiling and/or thermal limit may be associated with a higher priority than previously applied lower and/or upper bounds, including the operational floor, existing workload, bottleneck, and/or minimum configuration.

Finally, the operating level is applied to the GPU (operation 420). For example, the operating level may be used to configure the operating voltage, operating frequency, memory bandwidth, latency, and/or throughput of the GPU so that the GPU is capable of safely, effectively, and/or efficiently processing the incoming workload once the incoming workload arrives at the GPU.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for configuring a graphics-processing unit (GPU) in a computer system, comprising:
    operating the GPU on a current workload, wherein the current workload is a first amount of processing currently being performed by the GPU;
    during the operating, predicting an incoming workload to the GPU prior to presentation of the incoming workload to the GPU, wherein the incoming workload is a second amount of processing to be performed by the GPU after completion of the current workload;
    determining an operational floor for the GPU based on the incoming workload, wherein the operational floor comprises minimum values for one or more parameters controlling operation of the GPU in the computer system, wherein the one or more parameters affect a performance level of the GPU and the operational floor represents a lower bound on the performance level of the GPU, and wherein values higher than the minimum values for the one or more parameters lead to a higher power consumption;
    operating the GPU on the current workload with the one or more parameters each programmed to at least the corresponding minimum value indicated by the operational floor, wherein the operational floor defines a configuration of the hardware that is sufficient for the current workload of the GPU and for processing the incoming workload within a specified period of time and at a minimum power consumption; and
    preventing programming of the one or more parameters to second values below the minimum values indicated by the operational floor even though the second values would be sufficient for the current workload.

2. The method as recited in claim 1 wherein predicting the incoming workload is responsive to a number of commands in commands buffers associated with the GPU.

3. The method as recited in claim 1 wherein predicting the incoming workload is responsive to a number graphics calls to the GPU.

4. The method as recited in claim 1 wherein predicting the incoming workload is responsive to a number of applications being launched that are associated with the GPU.

5. The method as recited in claim 1 wherein predicting the incoming workload is responsive to activity in application programming interfaces (APIs) associated with the GPU.

6. The method as recited in claim 1 wherein the one or more parameters comprise an operating voltage and an operating frequency.

7. The method as recited in claim 6 wherein the one or more parameters further comprise a memory bandwidth allocation to the GPU.

8. The method as recited in claim 6 wherein the one or more parameters further comprise a power-gating configuration for the GPU.

9. The method as recited in claim 6 wherein the one or more parameters further comprise a cache configuration in the GPU.

10. The method as recited in claim 6 wherein the one or more parameters further comprise a throughput of the GPU.

11. The method as recited in claim 1 further comprising increasing an operating level of the GPU responsive to the operational floor and an operational ceiling that is dependent on thermal limits.

12. A non-transitory computer-readable storage medium storing instructions which, when executed on a computer that includes a graphics processing unit (GPU), cause the computer to:
    during operation of the GPU on a current workload, predict an incoming workload to the GPU prior to presentation of the incoming workload to the GPU, wherein the current workload is a first amount of processing currently being performed by the GPU and the incoming workload is a second amount of processing to be performed by the GPU after completion of the current workload;
    determine an operational floor for the GPU based on the incoming workload, wherein the operational floor comprises minimum values for one or more parameters controlling operation of the GPU in the computer, wherein the one or more parameters affect a performance level of the GPU and the operational floor represents a lower bound on the performance level of the GPU, and wherein values higher than the minimum values for the one or more parameters lead to a higher power consumption;
    operate the GPU on the current workload with the one or more parameters each programmed to at least the corresponding minimum value indicated by the operational floor, wherein the operational floor defines a configuration of the hardware that is sufficient for the current workload of the GPU and for processing the incoming workload within a specified period of time and at a minimum power consumption; and
    prevent programming of the one or more parameters to second values below the minimum values indicated by the operational floor even though the second values would be sufficient for the current workload.

13. The non-transitory computer-readable storage medium as recited in claim 12 wherein the incoming workload is predicted responsive to a number of commands in commands buffers associated with the GPU.

14. The non-transitory computer-readable storage medium as recited in claim 12 wherein the one or more parameters comprise an operating voltage and an operating frequency.

15. The non-transitory computer-readable storage medium as recited in claim 14 wherein the one or more parameters further comprise a memory bandwidth allocation to the GPU.

16. The non-transitory computer-readable storage medium as recited in claim 12 wherein the instructions, when executed, cause the computer to increase an operating level of the GPU responsive to the operational floor and an operational ceiling that is dependent on thermal limits.

17. A computer system comprising:
- a processor;
- a graphics processing unit (GPU); and
- a non-transitory computer-readable storage medium comprising instructions executable by one or more of the processor and the GPU, wherein the instructions, when executed, cause the computer to:
- during operation of the GPU on a current workload, predict an incoming workload to the GPU prior to presentation of the incoming workload to the GPU, wherein the current workload is a first amount of processing currently being performed by the GPU and the incoming workload is a second amount of processing to be performed by the GPU after completion of the current workload;
- determine an operational floor for the GPU based on the incoming workload, wherein the operational floor comprises minimum values for one or more parameters controlling operation of the GPU in the computer system, wherein the one or more parameters affect a performance level of the GPU and the operational floor represents a lower bound on the performance level of the GPU, and wherein values higher than the minimum values for the one or more parameters lead to a higher power consumption;
- operate the GPU on the current workload with the one or more parameters each programmed to at least the corresponding minimum value indicated by the operational floor, wherein the operational floor defines a configuration of the hardware that is sufficient for the current workload of the GPU and for processing the incoming workload within a specified period of time and at a minimum power consumption; and
- prevent programming of the one or more parameters to second values below the minimum values indicated by the operational floor even though the second values would be sufficient for the current workload.

18. The computer system as recited in claim 17 wherein the instructions, when executed, cause the computer to increase an operating level of the GPU responsive to the operational floor and an operational ceiling that is dependent on thermal limits.

* * * * *